United States Patent
Kobayashi

(10) Patent No.: US 7,929,827 B2
(45) Date of Patent: Apr. 19, 2011

(54) INFORMATION RECORDING APPARATUS

(75) Inventor: Takeshi Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1050 days.

(21) Appl. No.: 11/730,638

(22) Filed: Apr. 3, 2007

(65) Prior Publication Data

US 2007/0248312 A1  Oct. 25, 2007

(30) Foreign Application Priority Data

Apr. 5, 2006  (JP) ................................ 2006-103734

(51) Int. Cl.
*H04N 5/93* (2006.01)
(52) U.S. Cl. ........................................................ 386/279
(58) Field of Classification Search .................. None
See application file for complete search history.

(56) References Cited

U.S. PATENT DOCUMENTS

| 6,237,106 | B1 * | 5/2001 | Koyama et al. ............... 713/502 |
| 2009/0034937 | A1 * | 2/2009 | Kusunoki et al. ............ 386/96 |

FOREIGN PATENT DOCUMENTS

| JP | 2001-76424 | 3/2001 |
| JP | 2001-167516 | 6/2001 |

OTHER PUBLICATIONS

English Translation of Abstract and Detailed Description for Japanese Application Publication 2001-167516.*

* cited by examiner

*Primary Examiner* — Peter-Anthony Pappas
*Assistant Examiner* — Eileen Adams
(74) *Attorney, Agent, or Firm* — Morgan, Lewis & Bockius LLP

(57) ABSTRACT

An information recording apparatus has several function units that perform: storing a time when dubbing is started, halting the dubbing temporarily when that the connecting cable is disconnected, and storing a dubbing time and the picture and audio data for a predetermined time period when the dubbing process is halted temporarily as temporary halt picture and audio information; and when the cable is reconnected, calculating a disconnection time of the cable, rewinding magnetic tape to a predetermined time period ahead of a presumed temporary halt position based on the disconnection time, reproducing the magnetic tape, determining whether a data pattern of the reproduced picture and audio data matches a data pattern of the temporary halt picture and audio information; and if they match, restarting the dubbing process from a position on the magnetic tape corresponding to final recording of the temporary halt picture and audio information.

3 Claims, 2 Drawing Sheets

INFORMATION RECORDING APPARATUS

This application is based on Japanese Patent Application No. 2006-103734 filed on Apr. 5, 2006, the contents of which are hereby incorporated by reference.

BACKGROUND OF THE INVENTION

1. Field of the Invention

The present invention relates to an information recording apparatus. More specifically, the present invention relates to an information recording apparatus for dubbing digital picture and audio information recorded on a magnetic tape onto a recording medium.

2. Description of Related Art

Conventionally, there is widely available a digital information reproducing apparatus that reproduces digital information generated by a digital video camera or the like, which is capable of taking pictures of objects and portraits, recording the taken picture information and audio information obtained with a microphone on magnetic tape, and reproducing the picture information and the audio information recorded on the magnetic tape so that the picture can be reproduced on a display device of a TV set or the like and the sounds can be reproduced from a speaker or the like.

There is a case where the picture and audio information recorded on the magnetic tape set in the digital information reproducing apparatus is required to be dubbed onto a recording medium such as a hard disk or an optical disc by using the information recording apparatus. In this case, a digital input and output terminal of the digital information reproducing apparatus is connected to a digital input and output terminal of the information recording apparatus via an IEEE (Institute of Electrical and Electronics Engineers) 1394 cable or the like. The digital information reproducing apparatus is set to work in a reproducing mode while the information recording apparatus is set to work in a recording mode, to that the picture and audio information recorded the magnetic tape is reproduced and is sent to the information recording apparatus. Thus, the picture and audio information recorded on the magnetic tape can be recorded on the recording medium.

In this way, a dubbing process is performed for recording picture and audio information, which is recorded on the magnetic tape in the digital information reproducing apparatus, onto the recording medium in the information recording apparatus. During this dubbing process, if the cable is disconnected from the digital input and output terminal of the digital information reproducing apparatus and/or the digital input and output terminal of the information recording apparatus for any reason, the dubbing process is interrupted. If the dubbing process is interrupted in this way, the information recording apparatus may detect the disconnection of the cable, so that a recording operation is stopped or halted temporarily in an automatic manner. At this point, although there are some information recording apparatuses that continue their recording operation even if their cables are disconnected, the continuation of the recording operation is not good because it will use a recording area of the recording medium wastefully.

However, although the above-mentioned information recording apparatus stops or halts temporarily the recording operation automatically when disconnection of the cable is detected, the digital information reproducing apparatus will continues its reproducing operation even if the cable is disconnected. Therefore, when the cable is reconnected and the dubbing process is restarted, it is necessary to find a reproduction position on the magnetic tape when the dubbing became disable due to the disconnection of the cable (a reproduction position on the magnetic tape when the cable was disconnected). In this case, a user has to repeats additional reproduction operations, fast rewind operations and fast forward operations many times with the information recording apparatus for checking until which position the contents have already been dubbed onto the recording medium. These operations may be tiresome for the user. In addition, if the user feels that the operations for checking until which position the contents have already been dubbed onto the recording medium are tiresome, the user may perform the dubbing process again from the beginning. In this case, however, a recording area of the recording medium in the information recording apparatus may be used wastefully.

At this point, conventional techniques of restarting a dubbing process after stopping the same are disclosed in JP-A-2001-167516 and JP-A-2001-76424, for example. The conventional technique described in JP-A-2001-167516 is a technique of performing the dubbing process between information processing apparatuses (i.e., information recording apparatuses) such as a plurality of video cassette recorders (VCRs) that are connected to a network, and it is not the technique about a process for dubbing the picture and audio information in the digital information reproducing apparatus to the information recording apparatus such as a hard disk recorder or a DVD recorder. In this conventional technique, if the information processing apparatus is reconnected after disconnected from the network during the dubbing process, it restarts the dubbing process after rewinding the tape based on a dubbing timer value that is stored in a flash ROM. However, it is not always true that a stop position after rewinding the tape is a restart position of the dubbing process. The reason is as follows. Although the restart position of the dubbing process is determined based on the dubbing timer value stored in the flash ROM, there may be a case where the stop position after rewinding the tape does not match the position from which the dubbing process should be restarted when an inertia force due to rotation of the tape is added. Therefore, there will be a problem that it is difficult to restart the dubbing process of information in a correctly continuous manner from the information dubbed last time if the stop position after rewinding the tape does not match the restart position of the dubbing process.

The conventional technique described in JP-A-2001-76424 is a technique concerning a data recording apparatus that makes a duplicates of recording media between mini discs (MDs), and it is not the technique for dubbing the picture and audio information recorded on the magnetic tape set in the digital information reproducing apparatus onto a recording medium in the information recording apparatus such as a hard disk recorder or a DVD recorder. In this conventional technique, cluster addresses of a master disc and a target disc are recorded and kept in a nonvolatile flash memory every time when dubbing of one cluster is finished during the dubbing process of a data that is recorded by the cluster. If the dubbing process is interrupted, restart of the dubbing process is performed by reading a data to be recorded in the interrupted cluster from the master MD based on the cluster address read out from the flash memory and by recording the data on the target MD in the address next to the cluster address read out from the flash memory.

SUMMARY OF THE INVENTION

In view of the above described problem, it is an object of the present invention to provide an information recording apparatus that can restart a dubbing process in a continuous manner from the interrupted position when the dubbing process of picture and audio information recorded on a magnetic tape set in a digital information reproducing apparatus onto a recording medium is interrupted by disconnection of a cable and then the cable is reconnected.

To attain the above described object, an information recording apparatus in accordance with one aspect of the present invention, that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus includes: a timer controlling unit that makes a timer start a time measuring operation when the dubbing process is started; an initial time storing unit for storing a time when the timer starts its operation in a memory; a cable connection determining unit that determines whether or not the cable is disconnected during the dubbing process; a dubbing temporarily halting unit that halts the dubbing process temporarily when it is determined that the cable is disconnected; a temporary halt recording time and picture and audio information storing unit that stores a recording time until the dubbing process is halted temporarily as a temporary halt recording time in the memory and stores picture and audio information for a predetermined time period when dubbing process is halted temporarily as temporary halt picture and audio information in the memory; a cable disconnection time calculating unit that calculates a disconnection time of the cable based on a difference between the temporary halt recording time and a reconnection elapsed time until connection of the cable when the cable connection determining unit determines that the cable is reconnected after the temporary halt; a fast rewind controlling unit that rewinds fast the magnetic tape of the digital information reproducing apparatus back to a predetermined time period head of a presumed temporary halt position (hereinafter referred to as "the rewind position") based on the disconnection time; a data pattern determining unit that performs a reproducing operation on the magnetic tape after the magnetic tape is rewound to the rewind position and determines whether or not a data pattern of the reproduced picture and audio data matches a data pattern of the temporary halt picture and audio information; and a dubbing restart controlling unit that restarts the dubbing process from a position on the magnetic tape corresponding to final recording of said temporary halt picture and audio information (hereinafter referred to as "restarting position") when it is determined that the data pattern of the reproduced picture and audio data matches the data pattern of the temporary halt picture and audio information.

In this first structure, when the dubbing process is started, the timer controlling unit performs initial setting of the timer, i.e., sets a measured time of the timer to 0 second and starts its measuring operation. In addition, the initial time storing unit stores the initial time when the timer starts its measuring operation in the memory. After that, the cable connection determining unit determines whether or not the cable is disconnected during the dubbing process is performed. If it is determined that the cable is disconnected, the dubbing temporarily halting unit halts the dubbing process temporarily. At this point, the information reproducing apparatus continues its reproducing operation even when the recording operation of the information recording apparatus is stopped so that the dubbing process is halted temporarily.

When the dubbing process is halted temporarily in this way, the temporary halt recording time and picture and audio information storing unit stores the recording time measured by the timer when the dubbing process is halted temporarily as the temporary halt recording time in the memory and stores the picture and audio data for a predetermined time period when the dubbing process is halted temporarily as the temporary halt picture and audio information in the memory utilizing well know manner. After that, when a user connects the cable between the digital information reproducing apparatus and the information recording apparatus, the cable connection determining unit determines that the cable is reconnected.

Next, the cable disconnection time calculating unit obtains the reconnection elapsed time that indicates a measured time of the timer until the time when the cable is connected and the temporary halt recording time read out from the memory, and it calculates the disconnection time of the cable based on a difference between the reconnection elapsed time and the temporary halt recording time. After that, the fast rewind controlling unit controls the digital information reproducing apparatus to rewind fast the magnetic tape of the information reproducing apparatus back to the rewind position based on the disconnection time.

After the magnetic tape is rewound fast back to the rewind position in this way, the data pattern determining unit performs the reproducing operation on the magnetic tape and determines whether or not a data pattern of the reproduced picture and audio data matches a data pattern of the temporary halt picture and audio information. If they don't match each other, the magnetic tape is rewound a little further more and the reproduction process is performed. If they match each other, the dubbing restart controlling unit starts the dubbing process from the restarting position.

According to this first structure, even if the cable is disconnected during the dubbing process of the picture and audio information recorded on the magnetic tape in the information reproducing apparatus onto the recording medium, the dubbing process can be restarted from the position where the recording is interrupted if the cable is reconnected. Therefore, it is not necessary to operate the information recording apparatus so as to perform the reproduction operation, the fast rewind operation, the fast forward operation or the like for checking until which position the contents are dubbed on the recording medium, unlike the conventional apparatus. Thus, usability of the apparatus is improved. In addition, a recording area of the recording medium is not used wastefully, so that the recording medium can be used efficiently. In addition, even if an inertia force of rotation of the tape is added when the magnetic tape is rewound fast to stop at the restart position of the dubbing process, the dubbing restart position can be corrected so that the data pattern of the reproduced picture and audio data matches the data pattern of the temporary halt picture and audio information. Therefore, a correct dubbing restart position can be obtained, thereby pictures and sounds can be continuous correctly in the dubbing process.

To attain the above described object, an information recording apparatus in accordance with other aspect of the present invention, that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus having a system controller that performs the steps of: controlling a timer to start its measuring operation when the dubbing process is started; storing a time when the timer starts its measuring operation in a memory; determining whether or not the cable is disconnected during the dubbing process; halting the dubbing process temporarily when it is determined that the cable is disconnected; storing a dubbing time until the time when the dubbing process is halted temporarily as a temporary halt recording time in the memory, and storing the picture and audio information for a predetermined time period when the dubbing process is halted temporarily as temporary halt picture and audio information in the memory; calculating a disconnection time of the cable based on a difference between the temporary halt recording time and a reconnection elapsed time until connection of the cable when it is determined that the cable is reconnected after the temporary halt; rewinding fast the magnetic tape of the digital information reproducing apparatus back to the rewind position based on the disconnection time; performing a reproducing operation on the magnetic tape after the magnetic tape is rewound to the rewind position, and determining whether or not a data pattern of the reproduced picture and audio data matches a data pattern of the temporary halt picture and audio information; and restarting the dubbing process from the restarting position on the magnetic tape when it is determined that the data pattern of the reproduced picture and audio data matches the data pattern of the temporary halt picture and audio information.

In this second structure, when the cable is disconnected during the dubbing process for recording the picture and audio information supplied from the digital information reproducing apparatus on the recording medium, the dubbing process is halted temporarily. The recording time at that time is stored as the temporary halt recording time in the memory, and the picture and audio information for a predetermined time period is stored as the temporary halt picture and audio information in the memory. After that, a disconnection time of the cable is calculated based on a difference between the temporary halt recording time and a reconnection elapsed time that indicates a measured time until connection of the cable when the cable is reconnected. Then, the digital information reproducing apparatus is controlled to perform an operation of rewinding fast the magnetic tape back to the rewind position based on the disconnection time. After the magnetic tape is rewound fast back to the rewind position, the reproducing operation is performed on the magnetic tape. When it is determined that a data pattern of the reproduced picture and audio data matches a data pattern of the temporary halt picture and audio information, the dubbing process is restarted from the restarting position.

According to this second structure, even if the cable is disconnected during the dubbing process of the picture and audio information recorded on the magnetic tape in the digital information reproducing apparatus onto the recording medium, the dubbing process can be restarted from the position where the recording is interrupted if the cable is reconnected. Therefore, it is not necessary to operate the information recording apparatus so as to perform the reproduction operation, the fast rewind operation, the fast forward operation or the like additionally for checking until which position the contents are dubbed on the recording medium, unlike the conventional apparatus. Thus, usability of the apparatus is improved. In addition, a recording area of the recording medium is not used wastefully, so that the recording medium can be used efficiently. In addition, even if an inertia force of rotation of the tape is added when the magnetic tape is rewound fast and stops at the restart position of the dubbing process, the dubbing restart position can be corrected so that the data pattern of the reproduced picture and audio data matches the data pattern of the temporary halt picture and audio information. Therefore, a correct dubbing restart position can be obtained, so that pictures and sounds can be continuous correctly in the dubbing process.

An information recording apparatus in accordance with still other aspect of the present invention, is characterized by a structure in the above described second structure in which the system controller performs the steps with a timer controlling unit, an initial time storing unit, a cable connection determining unit, a dubbing temporarily halting unit, a temporary halt recording time and picture and audio information storing unit, a cable disconnection time calculating unit, a fast rewind controlling unit, a data pattern determining unit, and a dubbing restart controlling unit.

Therefore, the system controller can realize functions of a timer controlling process, an initial time storing process, a cable connection determining process, a dubbing temporary halting process, a temporary halt recording time and picture and audio information storing process, a cable disconnection time calculating process, a fast rewind controlling process, a data pattern determining process and a dubbing restart controlling process. Thus, even if the cable is disconnected during the dubbing process of the picture and audio information recorded on the magnetic tape in the digital information reproducing apparatus onto the recording medium, the dubbing process can be restarted from the position where the recording is interrupted if the cable is reconnected.

The information recording apparatus that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus comprising: a timer controlling unit that makes a timer start a time measuring operation when the dubbing process is started; an initial time storing unit for storing a time when the timer starts its operation in a memory; a cable connection determining unit that determines whether or not the cable is disconnected during the dubbing process; a dubbing temporarily halting unit that halts the dubbing process temporarily when it is determined that the cable is disconnected; a temporary halt recording time and picture and audio information storing unit that stores a recording time until the dubbing process is halted temporarily as a temporary halt recording time in the memory and stores picture and audio information for a predetermined time period when dubbing process is halted temporarily as temporary halt picture and audio information in the memory; a cable disconnection time calculating unit that calculates a disconnection time of the cable based on a difference between the temporary halt recording time and a reconnection elapsed time until connection of the cable when the cable connection determining unit determines that the cable is reconnected after the temporary halt; a fast rewind controlling unit that rewinds fast the magnetic tape of the digital information reproducing apparatus back to the rewind position based on the disconnection time; a data pattern determining unit that performs a reproducing operation on the magnetic tape after the magnetic tape is rewound to the rewind position and determines whether or not a data pattern of the reproduced picture and audio data matches a data pattern of the temporary halt picture and audio information; and a dubbing restart controlling unit that restarts the dubbing process from the restarting position when it is determined that the data pattern of the reproduced picture and audio data matches the data pattern of the temporary halt picture and audio information. By this arrangement, even if the cable is disconnected during the dubbing process of the picture and audio information recorded on the magnetic tape in the digital information reproducing apparatus onto the recording medium, the dubbing process can be restarted from the position where the recording is interrupted if the cable is reconnected. Therefore, it is not necessary to operate the information recording apparatus so as to perform the reproduction operation, the fast rewind operation, the fast forward operation or the like for checking until which position the contents are dubbed on the recording medium, unlike the conventional apparatus. Thus, usability of the apparatus is improved. In addition, a recording area of the recording medium is not used wastefully, so that the recording medium can be used efficiently. In addition, even if an inertia force of rotation of the tape is added when the magnetic tape is rewound fast and stops at the restart position of the dubbing process, the dubbing restart position can be corrected so that the data pattern of the reproduced picture and audio data matches the data pattern of the temporary halt picture and audio information. Therefore, a correct dubbing restart position can be obtained, so that pictures and sounds can be continuous correctly in the dubbing process.

As above described, the information recording apparatus that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus having a system controller that performs the steps of: controlling a timer to start its measuring operation when the dubbing process is started; storing a time when the timer starts its measuring operation in a memory; determining whether or not the cable is disconnected during the dubbing process; halting the dubbing process temporarily when it is determined that the cable is disconnected; storing a dubbing time until the time when the dubbing process is halted temporarily as a temporary halt recording time in the memory, and storing the picture and audio information for a predetermined time period when the dubbing process is halted temporarily as temporary halt picture and audio information in the memory; calculating a disconnection time of the cable based on a difference between the temporary halt recording time and a reconnection elapsed time until connection of the cable when it is determined that the cable is reconnected after the temporary halt; rewinding fast the magnetic tape of the digital information reproducing apparatus back to the rewind position based on the disconnection time; performing a reproducing operation on the magnetic tape after the magnetic tape is rewound to the rewind position, and determining whether or not a data pattern of the reproduced picture and audio data matches a data pattern of the temporary halt picture and audio information; and restarting the dubbing process from the restarting position on the magnetic tape when it is determined that the data pattern of the reproduced picture and audio data matches the data pattern of the temporary halt picture and audio information. According to this structure, even if the cable is disconnected during the dubbing process of the picture and audio information recorded on the magnetic tape in the digital information reproducing apparatus onto the recording medium, the dubbing process can be restarted from the position where the recording is interrupted if the cable is reconnected. Therefore, it is not necessary to operate the information recording apparatus so as to perform the reproduction operation, the fast rewind operation, the fast forward operation or the like for checking until which position the contents are dubbed on the recording medium, unlike the conventional apparatus. Thus, usability of the apparatus is improved. In addition, a recording area of the recording medium is not used wastefully, so that the recording medium can be used efficiently. In addition, even if an inertia force of rotation of the tape is added when the magnetic tape is rewound fast and stops at the restart position of the dubbing process, the dubbing restart position can be corrected so that the data pattern of the reproduced picture and audio data matches the data pattern of the temporary halt picture and audio information. Therefore, a correct dubbing restart position can be obtained, thereby pictures and sounds can be continuous correctly in the dubbing process.

DETAILED DESCRIPTION OF THE PREFERRED EMBODIMENTS

Figure 1:
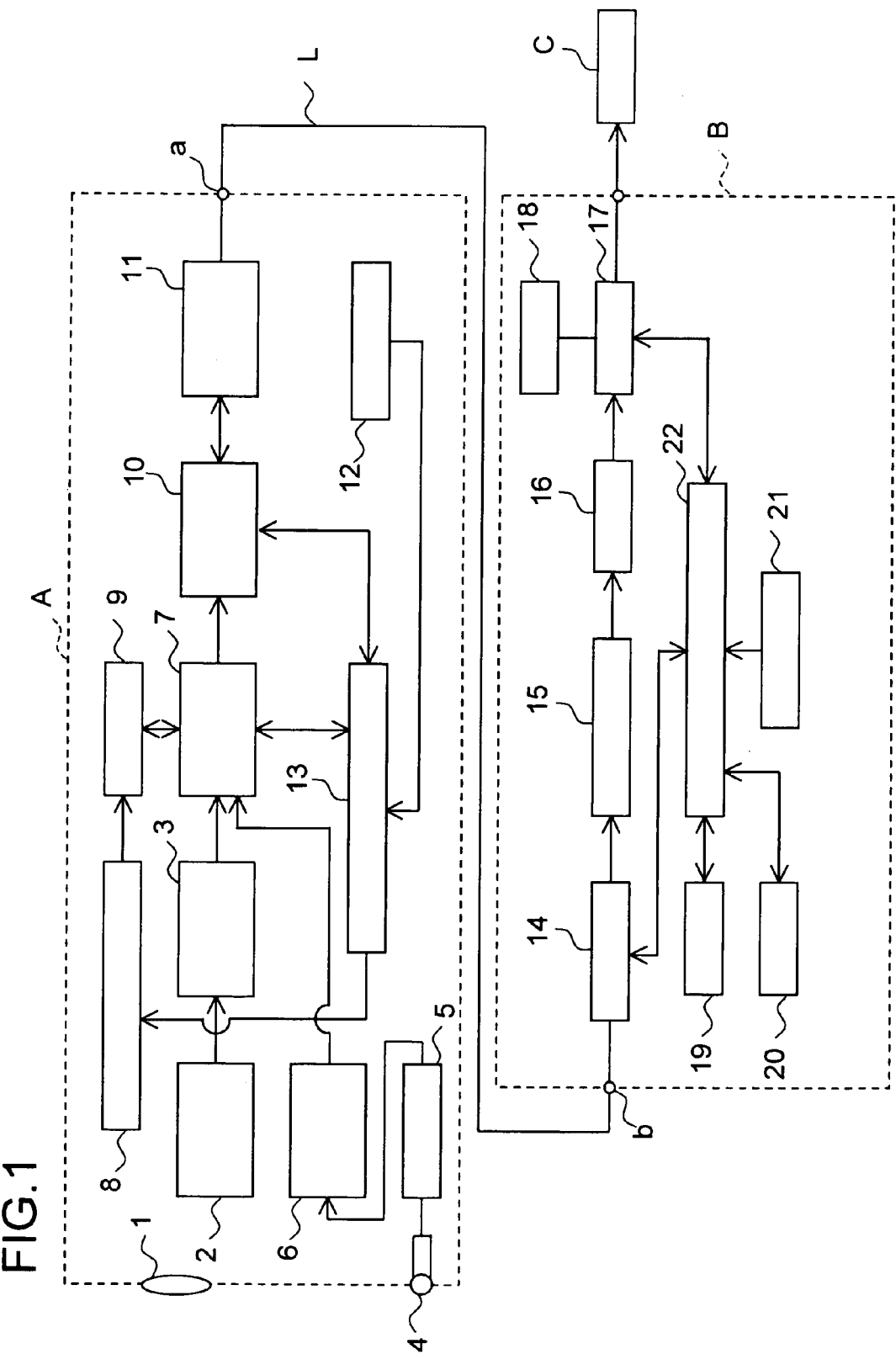
FIG. 1 is a block diagram to show a structure of an information recording apparatus according to an embodiment of the present invention and a digital video camera as an example of a digital information reproducing apparatus that is connected to the information recording apparatus.

Hereinafter, an embodiment of the present invention will be described with reference to the attached drawings. FIG. 1 is a block diagram to show a structure of an information recording apparatus according to an embodiment of the present invention and a digital video camera as an example of a digital information reproducing apparatus that is connected to the information recording apparatus.

In FIG. 1, a digital video camera A and an information recording apparatus B are connected to each other via a communication cable that is an IEEE (Institute of Electrical and Electronics Engineers) 1394 cable L, for example, so that pictures and sounds obtained by the digital video camera A can be dubbed by using the information recording apparatus B. More specifically, a digital input and output terminal "a" of the digital video camera A and a digital input and output terminal b of the information recording apparatus B are connected to each other via the IEEE 1394 cable L, so that a picture and audio data (picture and audio information) recorded on a magnetic tape 9 in the digital video camera A can be dubbed onto a recording medium 18 in the information recording apparatus B. At this point, the recording medium 18 is a hard disk if the information recording apparatus B is a hard disk recorder, while it is a DVD if the information recording apparatus B is a DVD recorder. Therefore the information recording apparatus B in the present embodiment can be either the hard disk recorder or the DVD recorder.

The digital video camera A is equipped with an imaging lens 1 for taking a picture of an object, an image sensor 2 such as a CCD that transforms the picture taken by the imaging lens 1 into an electric signal, a picture signal processing circuit 3 that converts an output signal of the image sensor 2 into a picture signal of a predetermined format, a microphone 4 for entering sounds, a microphone amplifier 5 that amplifies an audio signal that is an output of the microphone 4, an audio signal processing circuit 6 that converts the audio signal from the microphone amplifier 5 into a predetermined format of audio signal, a magnetic tape recording and reproducing portion 7 that receives the picture signal from the picture signal processing circuit 3 so as to convert it into a digital picture data and receives the audio signal from the audio signal processing circuit 6 so as to convert it into a digital audio data, so that the digital picture data and the digital audio data are recorded as a picture and audio data on the magnetic tape 9 or that reproduces a picture and audio data recorded on the magnetic tape 9, a magnetic tape driving mechanism 8 that drives the magnetic tape 9 to run for recording, reproducing, rewinding or feeding forward fast, a transmission and reception circuit 10 for transmitting the picture and audio data reproduced by the magnetic tape recording and reproducing portion 7 to the information recording apparatus B or for receiving a control signal from the information recording apparatus B, an IEEE 1394 interface 11 between the transmission and reception circuit 10 and the IEEE 1394 cable L, an operation portion 12 having a plurality of operation keys, and a system controller 13 that controls the entire of the camera.

The information recording apparatus B is equipped with a transmission and reception circuit 14 that is connected to the IEEE 1394 cable L via the digital input and output terminal b so as to receive a picture and audio data from the digital video camera A or to transmit the control signal to the digital video camera A, a data converter 15 that converts the picture and audio data unique to IEEE 1394 received by the transmission and reception circuit 14 into a normal picture and audio data that can be dealt by the information recording apparatus B, a decoder 16 that decodes the picture and audio data from the data converter 15, a memory 19 such as a flash ROM for storing a data necessary for controlling of recording the picture and audio data from the decoder 16 on a recording medium 18 after compressing the data based on the MPEG format, a timer 20 for measuring a recording time when the dubbing is performed for recording the picture and audio data from the digital video camera A onto the recording medium 18, an operation portion 21 that is a remote controller or the like including a plurality of operation keys, a system controller 22 that controls the entire apparatus, and a recording and reproducing portion 17, which is not essential to the present invention in particular, for expanding the picture and audio data recorded on the recording medium 18 and for reproducing the data that is supplied to a monitor device C.

In particular, as the characteristic of the present embodiment, the system controller 22 includes a timer controlling unit that performs initial setting of the timer 20 for measuring a recording time and controls the same to start its measuring operation when the dubbing process is started for recording the picture and audio data from the digital video camera A onto the recording medium 18, an initial time storing unit for storing initial time in the memory 19 when the timer 20 starts its operation, a cable connection determining unit that determines whether or not the IEEE 1394 cable L is disconnected during the dubbing process of the picture and audio information from the digital video camera A, a dubbing temporarily halting unit that halts the dubbing process temporarily if it is determined that the IEEE 1394 cable L is disconnected, and a temporary halt recording time and picture and audio information storing unit for storing a temporary halt recording time that is recording time measured by the timer 20 when the dubbing process is temporarily halted in the memory 19 and for storing a temporary halt picture and audio information that is the picture and audio data when dubbing process is temporarily halted in the memory 19.

In addition, the system controller 22 includes a cable disconnection time calculating unit that calculates disconnection time of the IEEE 1394 cable L base on a difference between the temporary halt recording time and reconnection elapsed time that indicates time of the timer 20 measured until the reconnection of the IEEE 1394 cable L when the cable connection determining unit determines that the IEEE 1394 cable L is reconnected after the dubbing process was temporarily halted, a fast rewind controlling unit that controls a fast rewind operation of the magnetic tape 9 of the digital video camera A back to the rewind position based on the disconnection time, a data pattern determining unit that determines whether or not a data pattern of the temporary halt picture and audio information matches a data pattern of a reproduced picture and audio data when the magnetic tape 9 is reproduced after the magnetic tape 9 is rewound fast to a predetermined time period ahead of the presumed temporary halt position, and a dubbing restart controlling unit that restarts the dubbing process from the restarting position of the magnetic tape 9 where the data pattern of the reproduced picture and audio data matches the data pattern of the temporary halt picture and audio information.

Figure 2:
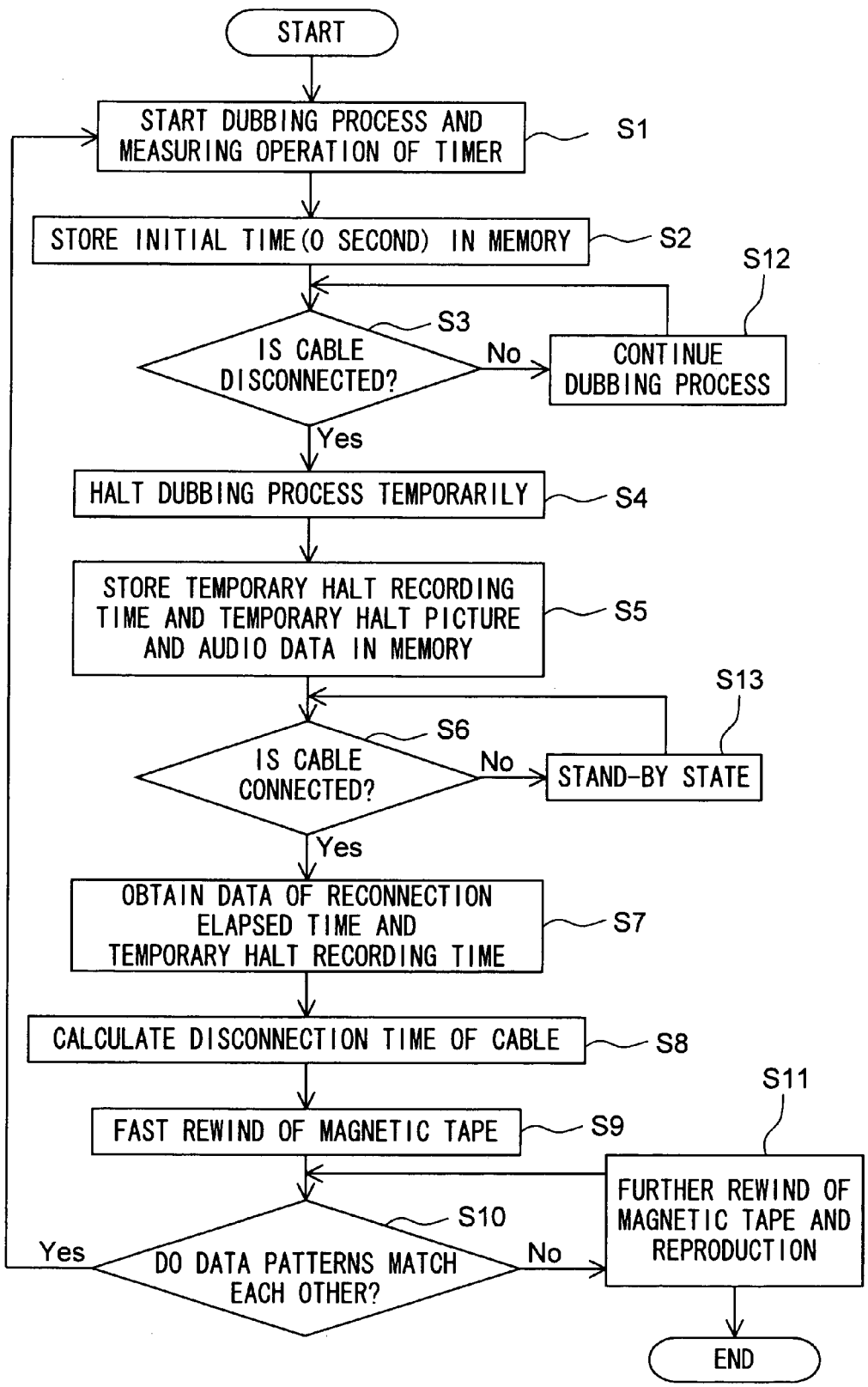
FIG. 2 is a flowchart for explaining a process in the case where a cable is disconnected and then is reconnected during a dubbing process of a picture and audio data from the digital information reproducing apparatus to the information recording apparatus in the present embodiment.

FIG. 2 is a flowchart for explaining a process in the case where the cable is disconnected and then is reconnected during the dubbing process of the picture and audio data from the digital information reproducing apparatus to the information recording apparatus in the present embodiment. With reference to this flowchart and FIG. 1, a process in the case where the cable is disconnected and then is reconnected during the dubbing process of the picture and audio data from the digital video camera to the information recording apparatus will be described.

In order to duplicate the picture and audio data recorded on the magnetic tape 9 set in the digital video camera A onto the recording medium 18 in the information recording apparatus B, the digital input and output terminal "a" of the digital video camera A is connected to the digital input and output terminal b of the information recording apparatus B via the IEEE 1394 cable L. Then, the operation portion 21 of the information recording apparatus B is operated so that the digital video camera A starts its reproducing operation and the information recording apparatus B starts its recording operation. More specifically, when a user performs key operations with the operation portion 21 so as to set a dubbing mode for dubbing the picture and audio data recorded on the magnetic tape 9 of the digital video camera A onto the recording medium 18 in the information recording apparatus B, the system controller 22 of the information recording apparatus B sets the recording and reproducing portion 17 to the recording mode and transmits the dubbing mode signal to the IEEE 1394 cable L via the transmission and reception circuit 14, and the system controller 13 of the digital video camera A receives the dubbing mode signal via the interface 11 and the transmission and reception circuit 10 so as to set the magnetic tape recording and reproducing portion 7 to the reproducing mode.

In this way, when the dubbing process is started, the timer controlling unit of the system controller 22 performs the initial setting of the timer 20, i.e., sets a measured time of the timer 20 to 0 second and starts its measuring operation (Step S1). In addition, the initial time storing unit of the system controller 22 stores the initial time (0 second) when the timer 20 starts its measuring operation in the memory 19 (Step S2). After that, the cable connection determining unit of the system controller 22 determines whether or not the IEEE 1394 cable L is disconnected from the input and output terminal "a" and/or the input and output terminal b (whether or not the IEEE 1394 cable L is disconnected) during the dubbing process is performed (Step S3). The determination whether or not the IEEE 1394 cable L is disconnected can be performed by detecting that a potential of a cable connection detection pin (not shown) of the digital input and output terminal "a" or b changes from a high level to a low level when the terminal of the IEEE 1394 cable L is disconnected from the digital input and output terminal "a" or b.

The dubbing process is performed continuously as long as it is determined that the IEEE 1394 cable L is not disconnected (Step S12). However, if it is determined that the IEEE 1394 cable L is disconnected, the dubbing temporarily halting unit of the system controller 22 stops the recording operation of the recording and reproducing portion 17 so that the dubbing process is halted temporarily (Step S4). At this point, the digital video camera A continues its reproducing operation even when the recording operation of the information recording apparatus B is stopped so that the dubbing process is halted temporarily.

When the dubbing process is halted temporarily in this way, the temporary halt recording time and picture and audio information storing unit of the system controller 22 stores the recording time measured by the timer 20 when the dubbing process was halted temporarily as the temporary halt recording time in the memory 19 and stores the picture and audio data for a predetermined time period (for example, two second) when the dubbing process is halted temporarily as the temporary halt picture and audio information in the memory 19 (Step S5).

After that, when the user connects the IEEE 1394 cable L between the digital input and output terminal "a" of the digital video camera A and the digital input and output terminal b of the information recording apparatus B, the cable connection determining unit of the system controller 22 determines that the IEEE 1394 cable L is connected. In other words, it determines that the IEEE 1394 cable L is reconnected (Step S6). The connection of the IEEE 1394 cable L is performed by detecting that a potentials of cable connection detection pins (not shown) of the digital input and output terminal "a" and b changes from a low level to a high level when the terminals of the IEEE 1394 cable L are connected to the digital input and output terminals "a" and b.

If the IEEE 1394 cable L is not connected between the digital input and output terminal "a" of the digital video camera A and the digital input and output terminal b of the information recording apparatus B, the information recording apparatus B becomes a stand-by state (Step S13). If the IEEE 1394 cable L is reconnected between the digital input and output terminal "a" of the digital video camera A and the digital input and output terminal b of the information recording apparatus B, the system controller 22 sends a stop command to the digital video camera A so that its reproducing operation is stopped, and it also stops the measuring operation of the timer 20. The cable disconnection time calculating unit of the system controller 22 obtains a data of the reconnection elapsed time that indicates a measured time of the timer 20 until the IEEE 1394 cable L is connected and a data of the temporary halt recording time read out from the memory 19 (Step S7), and it calculates the disconnection time of the IEEE 1394 cable L (time while the cable L is disconnected) based on a difference between the reconnection elapsed time and the temporary halt recording time (Step S8).

After that, the fast rewind controlling unit of the system controller 22 controls the digital video camera A to rewind fast the magnetic tape 9 of the digital video camera A back to the rewind position based on the disconnection time (Step S9). More specifically, the fast rewind controlling unit supplies a fast rewind control signal to the system controller 13 via the transmission and reception circuit 14, the IEEE 1394 cable L, the interface 11 of the digital video camera A and the transmission and reception circuit 10, so that the system controller 13 controls the magnetic tape driving mechanism 8 to drive and rewind fast the magnetic tape 9 back to the rewind position. Thus, the magnetic tape 9 is rewound fast back to the rewind position. This fast rewind operation can be completed in a short time automatically if it is preset by operating the operation portion 21 that the fast rewind operation is performed by a desired speed such as a double speed or a quadruple speed.

After the magnetic tape 9 is rewound fast back to the rewind position in this way, the system controller 22 controls the magnetic tape recording and reproducing portion 7 via the system controller 13 so that the reproducing operation is performed on the magnetic tape 9. Then, the data pattern determining unit determines whether or not a data pattern of the reproduced picture and audio data matches a data pattern of the temporary halt picture and audio information (Step S10).

More specifically, the system controller 22 of the information recording apparatus B supplies a reproduction control signal to the system controller 13 via the transmission and reception circuit 14, the IEEE 1394 cable L, the interface 11 of the digital video camera A, and the transmission and reception circuit 10, so that the system controller 13 controls the magnetic tape recording and reproducing portion 7 to perform the reproducing operation and drives the magnetic tape driving mechanism 8. Then, the magnetic tape recording and reproducing portion 7 reproduces the picture and audio data recorded on the magnetic tape 9, and the reproduced picture and audio data is supplied to the transmission and reception circuit 10, the interface 11, the IEEE 1394 cable L, and the transmission and reception circuit 14 of the information recording apparatus B.

Thus, the data pattern determining unit of the system controller 22 in the information recording apparatus B receives the data pattern of the reproduced picture and audio data that is received by the transmission and reception circuit 14 and determines whether or not the data pattern of the picture and audio data matches the data pattern of the temporary halt picture and audio information read out from the memory 19 (Step S10). If they don't match each other, the magnetic tape 9 is further rewound fast back a little more and the reproduction process is performed (Step S11). If they match each other, the process goes back to the step S1, in which the system controller 22 starts the dubbing process from the restarting position.

At this point, in the step S5 the temporary halt picture and audio data (temporary halt picture and audio information) that is stored in the memory 19 is a picture and audio data for a predetermined time period (e.g., two seconds) before the time point when the dubbing process was halted temporarily, and this picture and audio information becomes to be compared with the picture and audio data obtained by reproducing for a predetermined time period after the magnetic tape 9 is rewound fast in the steps S10 and S11. The fast rewinding of the magnetic tape 9 back to the rewind position is performed in accordance with the time period while the cable was disconnected that was calculated in the step S8. However, even if the fast rewinding is stopped after a little excessive rewinding from the desired stop position (the rewind position) due to a mechanical inertia force, the picture and audio data for about a predetermined time period, for example, two second, ahead of the actual interrupted position is reproduced. By this arrangement it is usual that the fast rewind control in the step S11 may not be necessary because both of data match each other in step 10 immediately.

As described above, according to the present embodiment, even if the cable is disconnected during the dubbing process of the picture and audio information recorded on the magnetic tape in the digital video camera, the dubbing process can be restarted from the position where the recording is interrupted when the cable is reconnected. Therefore, it is not necessary to operate the information recording apparatus so as to perform the reproduction operation, the fast rewind operation, the fast forward operation or the like for checking until which position the contents are dubbed on the recording medium, unlike the conventional apparatus. Thus, usability of the apparatus is improved. In addition, a recording area of the recording medium is not used wastefully, so that the recording medium can be used efficiently. In addition, even if an inertia force of rotation of the tape is added when the magnetic tape is rewound fast and stops at the rewind position, the dubbing restart position can be corrected so that the data pattern of the reproduced picture and audio data matches the data pattern of the temporary halt picture and audio information. Therefore, a correct dubbing restart position can be obtained, thereby pictures and sounds can be continuous correctly in the dubbing process.

The present invention can be applied to a dubbing function of an information recording apparatus such as a hard disk recorder or a DVD recorder that can be connected to a digital information reproducing apparatus such as a digital video camera or the like that can record picture and audio information on a magnetic tape and can reproduce picture and audio information recorded on a magnetic tape, so that a dubbing process of the picture and audio information recorded on the magnetic tape can be performed.

What is claimed is:

1. An information recording apparatus that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus comprising:
    a timer controlling unit that makes a timer start a time measuring operation when the dubbing process is started;
    an initial time storing unit for storing a time when the timer starts its operation in a memory;
    a cable connection determining unit that determines whether or not the cable is disconnected during the dubbing process;
    a dubbing temporarily halting unit that halts the dubbing process temporarily when it is determined that the cable is disconnected;
    a temporary halt recording time and picture and audio information storing unit that stores a recording time until the dubbing process is halted temporarily as a temporary halt recording time in the memory and stores picture and audio information for a predetermined time period when dubbing process is halted temporarily as temporary halt picture and audio information in the memory;
    a cable disconnection time calculating unit that calculates a disconnection time of the cable based on a difference between the temporary halt recording time and a reconnection elapsed time until connection of the cable when the cable connection determining unit determines that the cable is reconnected after the temporary halt;
    a fast rewind controlling unit that rewinds fast the magnetic tape of the digital information reproducing apparatus back to a predetermined time period head of a presumed temporary halt position based on the disconnection time;
    a data pattern determining unit that performs a reproducing operation on the magnetic tape after the magnetic tape is rewound to the predetermined time period head of a presumed temporary halt position and determines whether or not a data pattern of the reproduced picture and audio data matches a data pattern of the temporary halt picture and audio information; and
    a dubbing restart controlling unit that restarts the dubbing process from a position on the magnetic tape corresponding to final recording of said temporary halt picture and audio information when it is determined that the data pattern of the reproduced picture and audio data matches the data pattern of the temporary halt picture and audio information.

2. An information recording apparatus that is connected via a cable to a digital information reproducing apparatus that reproduces picture information and audio information recorded on a magnetic tape, so as to perform a dubbing process of the picture and audio information reproduced by the digital information reproducing apparatus onto a recording medium, the information recording apparatus having a system controller that performs the steps of:
    controlling a timer to start its measuring operation when the dubbing process is started;
    storing a time when the timer starts its measuring operation in a memory;
    determining whether or not the cable is disconnected during the dubbing process;
    halting the dubbing process temporarily when it is determined that the cable is disconnected;
    storing a dubbing time until the time when the dubbing process is halted temporarily as a temporary halt recording time in the memory, and storing the picture and audio information for a predetermined time period when the dubbing process is halted temporarily as temporary halt picture and audio information in the memory;
    calculating a disconnection time of the cable based on a difference between the temporary halt recording time and a reconnection elapsed time until connection of the cable when it is determined that the cable is reconnected after the temporary halt;
    rewinding fast the magnetic tape of the digital information reproducing apparatus back to the rewind position based on the disconnection time;
    performing a reproducing operation on the magnetic tape after the magnetic tape is rewound to the rewind position, and determining whether or not a data pattern of the reproduced picture and audio data matches a data pattern of the temporary halt picture and audio information; and
    restarting the dubbing process from the restarting position on the magnetic tape when it is determined that the data pattern of the reproduced picture and audio data matches the data pattern of the temporary halt picture and audio information.

3. The information recording apparatus according to claim 2, wherein the system controller performs the steps with a timer controlling unit, an initial time storing unit, a cable connection determining unit, a dubbing temporarily halting unit, a temporary halt recording time and picture and audio information storing unit, a cable disconnection time calculating unit, a fast rewind controlling unit, a data pattern determining unit, and a dubbing restart controlling unit.

* * * * *